United States Patent [19]

Kiritani et al.

[11] 4,021,595

[45] May 3, 1977

[54] PRESSURE SENSITIVE RECORDING SHEET

[75] Inventors: Masataka Kiritani; Hiroharu Matsukawa; Akio Watanabe; Hitoshi Imamiya, all of Fujimiya, Japan

[73] Assignee: Fuji Photo Film Co., Ltd., Minami-ashigara, Japan

[22] Filed: Jan. 16, 1975

[21] Appl. No.: 541,555

Related U.S. Application Data

[62] Division of Ser. No. 283,470, Aug. 24, 1972, Pat. No. 3,886,085.

[30] Foreign Application Priority Data

Aug. 31, 1971  Japan .............................. 46-66757

[52] U.S. Cl. .............................. 428/307; 282/27.5; 427/151; 428/905; 428/914
[51] Int. Cl.$^2$ .............................................. B32B 3/26
[58] Field of Search ........... 252/316; 428/307, 914; 427/151; 282/27.5

[56] References Cited

UNITED STATES PATENTS

| | | | |
|---|---|---|---|
| 3,429,827 | 2/1969 | Ruus | 252/316 |
| 3,432,327 | 3/1969 | Kan et al. | 252/316 X |
| 3,577,515 | 5/1971 | Vandegaer | 252/316 X |
| 3,726,804 | 4/1973 | Matsukawa et al. | 252/316 |

*Primary Examiner*—Richard D. Lovering
*Attorney, Agent, or Firm*—Sughrue, Rothwell, Mion, Zinn & Macpeak

[57] ABSTRACT

A pressure sensitive recording sheet having thereon a layer of fine oil microcapsules produced by the process which comprises dispersing or emulsifying finely in a polar solvent an oily liquid containing a substantially colorless color former capable of reacting with a developer to form a colored product and a polyisocyanate adduct having a free isocyanate group and adding to the dispersion or emulsion of the oil droplets a polyamine or a polyamine adduct having a free amino group as a polymerization promotor, whereby the polymerization of the polyisocyanate adduct is caused from the outer side of each oil droplet to encapsulate the oil droplet by the insolubilized polyisocyanate adduct. By this process the size of the microcapsules can be controlled quite easily.

9 Claims, No Drawings

PRESSURE SENSITIVE RECORDING SHEET

This is a division of application Ser. No. 283,470, filed Aug. 24, 1972 now U.S. Pat. No. 3,886,085.

BACKGROUND OF THE INVENTION

1. Field of the Invention

The present invention relates to a process for producing fine oil droplets in capsules having strong protective shells and more particularly it relates to a process for producing fine oil droplets or oil-containing microcapsules having strong protective outer shells by dispersing or emulsifying in a polar solvent a polyisocyanate adduct having a free isocyanate group and adding to the dispersion or emulsion a polyamine or a polyamine adduct having a free amino group as a polymerization promotor, whereby the polymerization of the polyisocyanate adduct is caused from the outer side of each oil droplet to insolubilize the polyisocyanate adduct.

According to the process of this invention, the size of the capsules can be controlled very easily and further the oil-containing capsules or microcapsules prepared by the process of this invention have strong outer shells showing quite a low permeability.

The oil-containing fine capsules or microcapsules produced by this invention may be used for the preparation of pressure-sensitive copying sheets as well as may be utilized for the purpose of generally protecting dyes, inks, perfumes, adhesives, medicaments, etc., in the oil-containing microcapsules and also for preserving therein foods which readily deteriorate.

2. Description of the Prior Art

For encapsulating an oily liquid by dispersing or emulsifying in a polar liquid the oily liquid having incorporated therein a wall- or shell-forming material and insolubilizing the wall-forming material from the outer side of each oil droplet in the dispersion or emulsion by the action of a polymerization promotor, etc., the following processes are known:

a. A process in which an initial polymerization product for synthetic resin having in the molecule both an oleophilic group and a hydrophilic group so that the molecules to be polymerized accumulate at the water-oil interfaces is dissolved in an oil, the oily liquid thus prepared is dispersed or emulsified in a polar solvent, and then a polymerization promotor is added to the dispersion or emulsion to cause the polymerization of the initial polymerization product from the outer side of each oily droplet in the dispersion or emulsion and to insolubilize there the initial polymerization product (see, Japanese Pat. Publication No. 19,574/'63).

b. A process in which a hydrophobic liquid containing polyurethane having a free isocyanate group is emulsified as fine droplets in water containing a cyclic diamine, whereby the free isocyanate group containing polyurethane is caused to react with the cyclic diamine at the interfaces between both of the liquids to form an insoluble polymer and encapsulate the oil droplets with the insoluble polymer (see, Japanese Pat. Publication No. 446/'67).

c. A process in which a hydrophobic liquid containing a polyisocyanate is emulsified in water containing a polyamine to cause the reaction of the polyisocyanate and the polyamine at the interfaces between both of the liquids and encapsulate the droplets of the hydrophobic liquid (see, Japanese Pat. Publication No. 771/'67).

d. A process in which a hydrophobic liquid containing a prepolymer of a polyisocyanate is dispersed in a hydrophilic liquid containing a polyamine or a polyhydroxy compound, whereby both of the components are reacted at the interfaces between both of the liquids to form a polymer insoluble in both liquids and encapsulate the droplets of the hydrophobic liquid with the insoluble polymer (see, British Pat. Specification No. 1,091,077).

e. A process in which an oily liquid containing a polyisocyanate monomer is dispersed or emulsified in a polar liquid and then a polyamine or a polyhydroxy compound is added to the dispersion or emulsion, whereby the polyisocyanate monomer is caused to react with the polyamine or the polyhydroxy compound at the interfaces between both of the liquids to form the walls of the capsules (see, British Pat. Specification No. 1,091,141).

Also, a pressure-sensitive copying sheet utilizing the microcapsules disclosed in British Pat. Specification No. 1,091,077 described above is set forth in the specification of Japanese Patent Publication No. 27,257/'69.

In the above-described processes (b), (c), and (d), the oil droplets are formed by adding a polyamine or a polyhydroxy compound to a polar liquid and then adding to the polar liquid an oily liquid containing a polyisocyanate monomer or a polyisocyanate prepolymer. In the process (e), a feature thereof is to use a polyisocyanate monomer.

However, in such known processes it is difficult to form strong and impermeable capsule walls or shells. That is to say, when a polyamine is incorporated in a polar liquid prior to the emulsification as in processes (b), (c), and (d) shown above, an aggregation occurs markedly on emulsification to form polynuclear capsules composed of several or several tens of aggregated oil droplets and in an extreme case the entire liquid is aggregated. Such polynuclear capsules are not very resistant to pressure or friction.

Furthermore, in the afore-described processes a film of a polymer is formed at the surface of the oil droplet during the emulsification, which results in making it difficult to emulsify further and also to control the size of the oil droplets.

In process (e) which employs a polyisocyanate monomer, the capsule walls formed are quite imperfect, the walls are not very resistant to pressure and friction, and the walls show a high permeability, which gives difficulties in the retention of the contents therein.

A first object of the present invention is to provide a process for producing microcapsules in which the size of microcapsules can be controlled very easily.

A second object of this invention is to provide a process for producing microcapsules having quite strong coating or walls.

A third object of this invention is to provide a process for producing microcapsules having coating or walls which are less permeable.

The other objects of the present invention will become apparent from the following descriptions.

SUMMARY OF THE INVENTION

Investigations have been made in various ways on the process (a) described above and as the result of these investigations, it has been discovered that when a polyisocyanate adduct having a free isocyanate group is used as the initial polymerization product for a synthetic resin having both an oleophilic group and a hydrophilic group and also a polyamine or a polyamine adduct having a free amino group is used in the process (a), astonishingly excellent results are obtained.

Thus, the above-described objects of this invention can be attained by using a polyisocyanate adduct having a free isocyanate group prepared by the addition reaction of a polyisocyanate and a compound having a hydrophilic group as the initial adduct for the synthetic resin having both an oleophilic group and a hydrophilic group in each molecule so that the molecules of the initial adduct to be polymerized gather at the water-oil interfaces and also using a polyamine or a polyamine adduct having a free amino group as the polymerization promotor in the process wherein the initial adduct is dissolved in an oily liquid, the oily liquid is dispersed or emulsified in a polar solvent, and then the polymerization promotor is added to the dispersion or emulsion to insolubilize the polyisocyanate adduct at the interfaces between both of the liquids from the outside of each oil droplet due to the action of the polymerization promotor.

DETAILED DESCRIPTION OF THE INVENTION

Important in the process of this invention is situation that a polyisocyanate adduct having a free isocyanate group and a polyamine or a polyamine adduct having a free amino group are employed and also important is the process feature that the polyisocyanate adduct is dissolved in an oily liquid, the oily liquid is further dispersed or emulsified in a polar solvent, and then the polyamine or the polyamine adduct is added to the dispersion or emulsion. Accordingly, in the process of this invention excellent advantages that have never been obtained using the conventional techniques are obtained by combining the specific materials and the process skillfully.

On the other hand, in the case of polymerizing a monomer of a polyisocyanate by dispersing the monomer in a polar solvent together with an oil, the walls or shells of the oil-containing capsules formed are quite weak, the content of the capsules exudes readily through the walls or shells of the capsules, and thus only imperfect capsules are obtained if a simple polyisocyanate monomer is employed in such a process.

As the polyisocyanate adduct having a free isocyanate group to be employed in the process of this invention such adducts as are prepared by adding oleophilic polyisocyanates to hydrophilic group-containing compounds such as polyamines, polycarboxylic acids, polythiols, polyhydroxy compounds, epoxy compounds, etc, are suitable. The term "polyisocyanate" used in the specification of this invention includes polyisocyanates and polyisothiocyanates. Examples of suitable oleophilic polyisocyanates include diisocyanates such as m-phenylenediisocyanate, p-phenylenediisocyanate, 2,6-tolylenediisocyanate, 2,4-tolylenediisocyanate, naphthalene-1,4-diisocyanate, diphenylmethane-4,4'-diisocyanate, 3,3'-dimethoxy-4,4'-biphenyldiisocyanate, 3,3'-dimethyldiphenylmethane-4,4'-diisocyanate, xylylene-1,4-diisocyanate, xylylene-1,3-diisocyanate, 4,4'-diphenylpropanediisocyanate, trimethylenediisocyanate, hexamethylenediisocyanate, propylene-1,2-diisocyanate, butylene-1,2-diisocyanate, ethylidynediisocyanate, cyclohexylene-1,2-diisocyanate, cyclohexylene-1,4-diisocyanate, xylylene-1,4-diisothiocyanate, ethylidynediisothiocyanate, hexamethylenediisocyanate, etc; triisocyanates such as 4,4',4"-triphenylmethanetriisocyanate, toluene-2,4,6-triisocyanate, etc.; and tetraisocyanates such as 4,4'-dimethyldiphenylmethane, 2,2',5,5'-tetraisocyanate, etc. Isothiocyanate compounds are also useful as well as isocyanate compounds in the present invention on a benefit of substantially same reactivities thereof.

Examples of suitable polyamines to be added to the polyisocyanates are aromatic polyamines such as o-phenylenediamine, p-phenylenediamine, 1,5-diaminonaphthalene, etc.; aliphatic polyamines such as 1,3-propylenediamine, 1,4-butylenediamine, hexamethylenediamine, etc.; and the like. Examples of suitable polycarboxylic acids are pimelic acid, suberic acid, azelaic acid, sebacic acid, phthalic acid, terephthalic acid, 4,4'-biphenyl-dicarboxylic acid, 4,4'-sulfonylbenzoic acid, etc. Examples of suitable polythiols are 1,4-dimercaptobutane, 3-mercaptomethyl-1,5-pentanedithiol and reaction products of such a polythiol and an alkylene oxide. Examples of suitable polyhydroxy compounds are aliphatic polyhydric alcohols, aromatic polyhydric alcohols, hydroxypolyesters, polyhydroxypolyalkylene ethers. Specific examples of such polyhydroxy compounds include catechol, resorcinol, hydroquinone, 1,2-dihydroxy-4-methylbenzene, 1,3-dihydroxy-4-methylbenzene, 3,4-dihydroxy-methylbenzene, 3,5-dihydroxy-1-methylbenzene, 2,4-dihydroxyethylbenzene, 1,3-naphthalenediol 1,5-naphthalenediol, 2,7-naphthalenediol, 2,3-naphthalenediol, o,o'-biphenol, p,p'-biphenol, 1,1'-bi-2-naphthol, bisphenol A, 2,2'-bis(4-hydroxyphenyl)butane, 2,2'-bis(4-hydroxyphenyl)isopentane, 1,1'-bis(4-hydroxyphenyl)cyclopentane, 1,1'-bis(4-hydroxyphenyl)cyclohexane, 2,2'-bis(4-hydroxy-3-methylphenyl)propane, bis(2-hydroxyphenyl)methane, xylylenediol, ethylene glycol, 1,3-propylene glycol, 1,4-butylene glycol, 1,5-pentanediol, 1,6-pentanediol, 1,7-heptanediol, 1,8-octanediol, 1,1,1-trimethylolpropane, hexanetriol, pentaerythritol, glycerin, sorbitol, and the like. Also, other aromatic polyhydric alcohols, aliphatic polyhydric alcohols, polyhydric phenol derivatives, etc., described in, e.g., *Senryo to Yakuhin* (*Dyes and Chemicals*);7, 438–55 (1962) may also be employed in this invention.

The hydroxypolyesters which can be used as the polyhydroxy compounds may be prepared from polycarboxylic acids and polyhydric alcohols. Examples of suitable polycarboxylic acids for producing the hydroxypolyesters are malonic acid, succinic acid, glutaric acid, adipic acid, pimelic acid, maleic acid, isophthalic acid, terephthalic acid, gluconic acid, etc. The above-described polyhydric alcohols can also be used as the polyhydric alcohols for preparing the hydroxypolyesters.

The hydroxypolyalkylene ethers which can be used as the polyhydroxyl compounds are the condensation products of alkylene oxides and polyhydric alcohols. Examples of suitable alkylene oxides used for preparing the hydroxypolyalkylene ethers are butylene oxide and amylene oxide. The above described polyhydric alcohols can also be employed as the alcohols for preparing the hydroxypolyalkylene ethers.

Examples of suitable epoxy compounds are aliphatic glycidyl ethers such as glycidyl ether, glycerine triglycidyl ether, and a polyallyl glycidyl ether having a molecular weight of from 150 to 5,000, etc.; aliphatic glycidyl esters such as the diglycidyl esters of linolein dimeric acids, etc.; aromatic gylcidyl ethers such as the diglycidyl ether of bisphenol A, the triglycidyl ether of trihydroxypropane, the tetraglycidyl ether of tetraphenylene ethane, etc.; and glycidyl ether/ester mixtures such as the diglycidyl ether ester of 4,4-bis(4-hydroxyphenyl)pentanoic acid.

As the polyamines which can be used as the polymerization promotor for promoting the polymerization of the polyisocyanate adduct having a free isocyanate group, there are illustrated aromatic polyamines such as o-phenylenediamine, p-phenylenediamine, diaminonaphthalene, etc.; aliphatic polyamines such as 1,3-propylenediamine, hexamethylenediamine, etc.; and the adducts of those aromatic or aliphatic polyamines and the epoxy compounds as described above. Also, a compound having many amino groups in the molecule such as a free amino group having adduct of polyamine and epoxy compound, thiourea-formaline resin and gelatin may be used. That is to say, any compounds each having more than two amino groups in the molecule may be used as the polymerization promotor in our invention.

The oily liquid to be encapsulated is an organic solvent immiscible with water, for instance, there are illustrated natural oils, synthetic oils, and solvents. Specific examples of these materials are paraffin oil, cotton seed oil, soybean oil, corn oil, olive oil, castor oil, fish oil, lard oil, chlorinated paraffin, chlorinated diphenyl, dibutyl phthalate, dioctyl phthalate, tributyl phosphate, tricresyl phosphate, dibutyl maleate, o-dichlorobenzene, alkyl naphthalene, toluene, benzyl alcohol, and the like.

The polar liquid used for forming the continuous phase in the process of this invention means liquids which are immiscible with the aforedescribed oily liquid. The most typical example of such a polar liquid is water but other polar liquids which are immiscible with an oily liquid to be capsulated such as alcohols (e.g., ethylene glycol, glycerin, butyl alcohol, octyl alcohol, etc., may also be used simply or in a mixture of water therewith.)

The oily liquid to be encapsulated may be dispersed or emulsified in the polar liquid by using a protective colloid or a surface active agent. Suitable protective colloids which can be used for this purpose are, for example, gelatin, gum arabic, casein, carboxymethyl cellulose, starch, polyvinyl alcohol, and the like, Suitable surface active agents are, for example, anionic surface active agents such as an alkylbenzene sulfonate, an alkylnaphthalene sulfonate, a polyoxyethylene sulfate, Turkey red oil etc., and nonionic surface active agents such as polyoxyethylene alkyl ether, polyoxyethylene alkylphenol ether, sorbitan fatty acid esters, etc.

In the process of our invention there are no particular limitations about conditions for practicing the process if only the above described materials and process are satisfied. A low reaction temperature in an emulsifying process or a process prior to the emulsification is preferred. On the other hand, after emulsification, in order to promote the hardening of the microcapsules formed in a short period of time, it is preferred to increase the temperature of the system.

Since a hardening reaction can be furnished so long as the system is subjected to the reaction during as sufficient period of time even at a low temperature (e.g., about 20° C), one skilled in the art may employ a desired temperature in the present invention. For example, when it is desired to harden microcapsules formed in a short period of time, it may be preferred to increase the temperature of the system to a range of from about 50° to about 90°. In case of increasing a temperature of the system after emulsification, it is necessary that the temperature is lower than a boiling point of the polar liquid forming a continuous layer.

The sizes of the microcapsules prepared by the process of this invention are on the order of from about 1 micron to about 1 millimeter and, most generally, in the range of 2 microns to 500 microns.

When the polyamine or the polyamine adduct having a free amino group is first added to a polar solvent and then an oily liquid containing the polyisocyanate adduct is dispersed or emulsified in the polar solvent containing an amine compound which does not have the characteristics of the amine used in the process of this invention, it is quite difficult to control the size of the oil drops formed, several oil drops are aggregated during the emulsification to form large aggregated capsule masses, and in an extreme case the entire dispersion or emulsion system is aggregated. Such large capsule masses are quite unstable to pressure and friction.

On the other hand, the oil containing microcapsules prepared by the process of this invention are mononuclear capsules having strong capsule walls or shells which are less permeable. In particular, when they are used in pressure sensitive copying sheets, as disclosed in, for example, U.S. Pat. Nos. 3,501,331, 3,506,471, 3,514,310, etc., quite excellent advantages are obtained. That is to say, a microcapsule sheet prepared by coating a support with conventional microcapsules containing therein a solution in an oily liquid of a substantially colorless compound (color former) having color reactivity encounters a difficulty in that when the conventional microcapsule sheet is superposed on a sheet having coated thereon a developer capable of forming a colored product by the reaction thereof with the above described color former and they are wetted with water, the color former in the microcapsules passes through the capsule walls or shells and transfers onto the layer of the developer causing color stains or fogs. Furthermore, in the case of manufacturing a pressure sensitive copying sheet having a layer of a developer on one side thereof and a layer of conventional microcapsules containing a color former on the opposite side, the use of such conventional microcapsules is accompanied by the following difficulty. That is to say, if, in applying a microcapsule containing composition to the sheet already having a layer of the developer on the opposite side, the microcapsule composition is scattered or passes through fine holes of the support and attaches to the layer of the developer coated on the opposite side of the sheet, a color reaction occurs between the developer and the color former in the capsules through the capsule walls or shells to cause color stains. This reduces greatly the commercial value of the pressure sensitive copying sheet. Still further, in manufacturing a pressure sensitive copying sheet having on the same side of a support a layer of a developer and a layer of microcapsules containing a color former, recording being possible by the use of a single sheet of this copying sheet, the color former in the microcapsules reacts with the developer through the walls or shells of the microcapsules to form color stains or fogs.

On the other hand, the microcapsules manufactured by the process of this invention have the advantage, due to the less permeable walls or shells of the capsules, that if the capsule containing composition is brought into contact with the developer during the manufacturing of the pressure sensitive copying sheets, no color stains or fogs are formed. Thus, the microcapsules prepared by the process of this invention have also the advantage that because no color stains or fogs form in the case of manufacturing a pressure sensitive copying sheet having on the same side of a support a layer of a developer and a layer of the microcapsules, articles having a very high commerical value can be manufactured.

Moreover, when a perfume is encapsulated by the process of this invention, the perfume can be preserved for a long period of time without being released through the capsule walls or shells.

When, on the other hand, a polyisocyanate monomer such as tolylene diisocyanate, hexamethylene diisocyanate, xylylene diisocyanate is employed, strong capsule walls are not obtained and also the capsule walls formed have a high permeability and thus the contents of the microcapsules will exude therefrom. Also, when the conventional microcapsules containing a color former are utilized for pressure sensitive copying sheets, they markedly possess color fogs and thus it is impossible to manufacture commercially valuable pressure sensitive sheets of the type in which the microcapsules containing a color former and a developer are applied in layers to a same side of the support.

However, in the case of this invention where the polyisocyanate initial addition product having a free isocyanate group is utilized, very strong capsule walls or shells are obtained and the walls or shells of the microcapsules have quite a low permeability, both of which are very important for manufacturing pressure sensitive copying sheets.

When the polyisocyanate adduct having a free isocyanate group is insoluble or weakly soluble in the oily liquid to be encapsulated, a subsidiary solvent may be added to the oily liquid to increase the solubility of the adduct. The subsidiary solvent is a material miscible with the oily liquid and having the action of solubilizing the polyisocyanate adduct having a free isocyanate group. Suitable examples of such subsidiary solvents are carbonyl compounds such as acetone, methyl ethyl ketone, methyl acetate, ethyl acetate, butyl acetate, tetrahydrofuran, dioxane, dimethylformamide, diphenyl sulphoxide, etc.

The following examples are given to illustrate this invention in greater detail but not to limit the invention in any way.

EXAMPLE 1

In 30 g of dipropyl naphthalene (oily liquid) containing 0.6 g of Crystal Violet Lactone and 0.5 g of Benzoyl Leucomethylene Blue as color formers for pressure sensitive copying sheets was dissolved 6 g of Coronate HL (trade name of a trimethylolpropane adduct of hexamethylene diisocyanate having a free isocyanate group made by Nippon Polyurethane Industry Co.) as a wall-forming material. The oily liquid thus prepared was added to 55 g of water at 20° C having dissolved therein 3 g of carboxymethyl cellulose and 3 g of polyvinyl alcohol with vigorous stirring to form oil droplets having diameters of 4 – 10 microns and thereafter the dispersion was diluted by adding 100 g of water. Then, 40 g of water containing 6 g of Epikure U (trade name of amino group-having adduct of aliphatic polyamine and glycidyl ether; vicosity of from 60 to 120 poises (at 25° C) made by Shell Chemical Co.) was added to the diluted dispersion. During the above procedure, the temperature of the system was maintained below 25° C.

For promoting the hardening of the above-described polyisocyanate adduct, the temperature of the system was increased to 60° C by heating to finish the formation of the capsules, whereby the polyisocyanate initial addition product was hardened around the oil droplets containing Crystal Violet Lactone and Benzoyl Leucomethylene Blue and quite strong and less permeable shells were formed thereby. The capsule-containing composition was applied to a paper and dried to give a microcapsule sheet for pressure sensitive copying sheets. When the capsule sheet thus prepared was heated to 100° C for 10 hours, none of the contents exuded from the microcapsules and no reduction in the coloring ability of the capsule sheet with a developer sheet was observed.

Furthermore, a developer composition consisting of 300 parts of water, 100 parts of acid clay, and 20 parts of a styrenebutadiene rubber latex was applied to the microcapsules to form a self recordable pressure sensitive copying sheet. No color stains or fogs were observed in the pressure sensitive copying sheet (when the color fog of the sheet was measured using a spectrophotometer, the density of the fog was 0.05 at 600 m$\mu$). When the sheets were pressed in localized areas, colored marks were obtained.

On the other hand, when a monomer such as hexamethylene diisocyanate (e.g., not containing a free isocyanate group) was used in place of Coronate HL in the above process, the system aggregated and thus microcapsules were not obtained and further when other diisocyanate monomers such as toluene-2,4,6-triisocyanate, tolylene diisocyanate, xylylene diisocyanate, and diphenylmethane diisocyanate were used respectively in place of Coronate HL, only microcapsules which had imperfect and highly permeable walls were obtained. That is to say, when the capsule paper prepared by applying each of these latter microcapsules and drying was heated to 100° C for 10 hours, the color density of the marks formed on a developer sheet by applying a localized pressure to the laminate of the capsule sheet and the developer sheet was quite low. Also, when a developer composition consisting of 300 parts of water, 100 parts of acid clay, and 20 parts of a styrene-butadiene rubber latex was applied to the layer of the microcapsules followed by drying, Crystal Violet Lactone and Benzoyl Leucomethylene Blue in the microcapsules exuded from the capsules to cause a reaction with the acid clay, whereby blue fogs appeared over the entire surface of the developer sheet (when the fog density was measured as in the above case, the fog density was 0.60 where xylene diisocyanate was used, 0.14 where diphenylmethane diisocyanate was used, and 0.21 where tolylene diisocyante was used).

On the other hand, 40 g of water containing 6 g of Epikure U was added to 55 g of water having dissolved therein 3 g of carboxymethyl cellulose and 3 g of polyvinyl alcohol and while stirring the mixture, 30 g of dipropylnaphthalene containing 0.6 g of Crystal Violet Lactone, 0.5 g of Benzyol Leucomethylene Blue, and 6 g of Coronate HL was added to the mixture, whereby the viscosity of the entire system increased greatly, the entire system was aggregated, and thus desirable microcapsules were not obtained.

EXAMPLE 2

To 20 g of toluene was added 6 g of Takenate D-103 (trade name of the adduct of tolylene diisocyanate and trimethylolpropane having a free isocyanate group made by Takeda Yakuhin K.K.) and then 6 g of acetone was added to the mixture for dissolving the Takenate D-103 in the toluene. The oily liquid thus prepared was added to 30 g of water containing 3 g of starch and 3 drops of Turkey red oil with vigorous stirring to form oil droplets having diameters of 10-15 microns and the dispersion was diluted by adding thereto 150 g of water. Then, 6 g of Epikure U was added to the dispersion and the system was stirred for 10 hours at room temperature. Whereby the adduct of tolylene diisocyanate and trimethylolpropane was hardened around the oil droplets to finish the encapsulation. By this procedure, toluene-containing microcapsules covered by quite strong and less permeable films or walls were formed. When the microcapsules were heated to 100° C for 10 hours, no lose of toluene was observed.

On the other hand, when the toluene-containing microcapsules prepared in the same manner as described above using tolylene diisocyanate in place of the Takenate D-103 were heated to 100° C for 10 hours, almost all of the toluene exuded therefrom.

Also, when the same procedures as above were followed without adding 20 g of toluene containing 6 g of Takenate D-103 and 6 of acetone to the system after the addition of 6 g of Epikure U to 30 g of water containing 3 g of starch and 3 drops of Turkey red oil, the entire system was aggregated and thus a microcapsule-containing composition was not obtained.

EXAMPLE 3

10 g of a perfume oil, Emerald Jasmin (made by Ogawa Koryo K.K.) was added to 20 g of an oily liquid, trichlorodiphenyl, and then 6 g of Coronate HL was added as a wall-forming material to the oily liquid. The oily liquid thus prepared was added to 55 g of water containing 2 g of carboxymethyl cellulose and 2 g of gum arabic with vigorous stirring to form oil droplets having diameters of 20-30 microns. Afterwards to the dispersion was added 90 g of water, 50 g of water containing 3 g of Epikure U and 0.5 g of hexamethylene diamine to the diluted dispersion with stirring and then the temperature of the system was increased to 70° C to finish the encapsulation, whereby perfume oil-containing microcapsules having quite strong shells were obtained. The thus obtained capsule-containing composition was applied to a paper and dried. When the microcapsule paper was allowed to stand for 3 months at room temperature, no perfume oil evaporated from the microcapsules and only when the microcapsules were ruptured by pressing, did they gave off a sweet smell of Emerald Jasmin.

On the other hand, when capsule composition were prepared in the same manner as described above using polyisocyanate monomers such as hexamethylene diisocyanate, diphenylmethane diisocyanate, etc., in place of the Coronate HL and were applied to papers, the perfume oil was evaporated at drying due to the imperfect capsule walls to give the smell of Emerald Jasmin in every case. When these coated papers were allowed to stand for 3 months at room temperature, almost no perfume component remained in the microcapsules and when the microcapsules were ruptured by pressing, they gave off almost no perfume smell.

EXAMPLE 4

6 g of Takenate D-110-N(trade name of the initial adduct of xylylenediisocyante having a free isocyanate group, made by Takeda Yakuhin Kogyo K.K.) was added as a wall-forming material to 35 g of trichlorodiphenyl having dissolved therein 1 g of Crystal Violet Lactone and 1 g of Benzoyl Leucomethylene Blue as color formers for pressure sensitive copying sheets and then 6 g of tetrahydrofuran was added to the mixture as a subsidiary solvent for promoting the resolution of Takenate D-110-N. The oily liquid thus prepared was added to 40 g of water having dissolved therein 2 g of carboxymethyl cellulose and 2 g of polyvinyl alcohol with vigorous stirring to form an emulsion containing oil droplets having diameters of 4-6 microns. Then, the emulsion was diluted with 100 g of water. 40 g of water containing a hardening agent, Epikure Z (trade name, methaphenylenediamine and 4,4'-diaminodiphenylmethane, made by Shell Chemical Co.) and 3 g of Epikure U was added to the emulsion prepared above to harden the polyisocyanate adduct. Furthermore, for completing the hardening of the adduct, the system was heated to 80° C. By the above procedure, microcapsules containing the oily liquid of Crystal Violet Lactone and Benzyol Leucomethylene Blue as color formers for pressure sensitive copying sheets and having quite strong and less permeable capsule walls were obtained. By applying the capsule composition to a paper and drying, a microcapsule sheet for pressure sensitive copying sheets was obtained. When the capsule sheet thus prepared was superposed on a developer sheet and they were allowed to stand in a wet conditions, the color formers in the microcapsules were not transferred onto the developer sheet and no color stains were observed on the developer sheet.

Further, a self-recordable type pressure sensitive copying sheet was prepared by applying the capsule composition prepared by the above described process of this invention to a paper followed by drying and then applying a developer composition consisting of 300 parts of water, 100 parts of acid clay, and 20 parts of styrenebutadiene rubber latex to the layer of the microcapsules followed by drying. The pressure sensitive copying sheet showed no color stains and only when the copying sheet was pressed in localized areas, blue marks were formed. On the other hand, the microcapsules prepared in the same manner as described above using xylylene diisocyanate monomer in place of Takenate D-110-N had quite imperfect capsule walls. That is to say, when a pressure sensitive copying sheet prepared by coating the capsule composition on a paper was superposed on a sheet having a developer containing layer and they were allowed to stand in a wet condition, the color formers in the capsules were transferred onto the developer sheet forming color stains of the later.

Furthermore, when the capsule composition was applied to a paper followed by drying and then the aforesaid developer composition was applied to the layer of the microcapsules followed by drying to form a self-recordable type pressure sensitive copying sheet, the color formers in the microcapsules exuded to cause a reaction with the developer and thus blue color stains appeared over the entire surface of the sheet.

EXAMPLE 5

By following the same procedure as described in Example 3 except that 6 g of gelatin was employed in place of 3 g of Epikure U and 0.5 g of hexamethylene diamine in Example 3, almost the same results as obtained in Example 3 were obtained.

While the invention has been described in detail and with reference to specific embodiments thereof, it will be apparent that various changes and modifications can be made therein without departing from the spirit and scope thereof.

What is claimed is:

1. A pressure sensitive recording sheet having thereon a layer of the fine oil microcapsules produced by the process which comprises dissolving in an oily liquid containing a substantially colorless color former capable of reacting with a developer to form a colored product a polyisocyanate adduct having a free isocyanate group, said polyisocyanate adduct being an adduct of hexamethylene diisocyanate and trimethylolpropane, an adduct of tolylenediisocyanate and trimethylolpropane or a xylylene diisocyanate adduct, said adduct having both an olephilic group and a hydrophilic group, dispersing or emulsifying said oily liquid containing said polyisocyanate adduct in a polar solvent, adding a polyamine or a polyamine adduct having a free amino group to said polar solvent, and polymerizing polyisocyanate adduct in said oily liquid.

2. The sheet of claim 1, wherein said polyamine is o-phenylenediamine, m-phenylenediamine, 4,4'-diaminodiphenylmethane, p-phenylenediamine, diaminonaphthalene, 1,3-propylene diamine, or hexamethylenediamine.

3. The sheet of claim 1, wherein said polyamine adduct is an adduct of an aromatic or aliphatic polyamine and an epoxy compound.

4. The sheet of claim 1, wherein said polyamine is gelatin.

5. The sheet of claim 1, wherein said polar solvent is water.

6. The sheet of claim 1, wherein said polar solvent is ethylene glycol, glycerine, butyl alcohol, or octyl alcohol, or a mixture of water and said alcohol.

7. The sheet of claim 1, wherein the temperature of the capsulation system is raised to polymerize to temperatures lower than the boiling point of the polar solvent.

8. The sheet of claim 1, wherein an additional solvent miscible with said oily liquid and capable of solubilizing said polyisocyanate adduct is added to said oily liquid.

9. The sheet of claim 8, wherein said additional solvent is acetone, methyl ethyl ketone, methyl acetate, ethyl acetate, butyl acetate, tetrahydrofuran, dioxane, dimethylformamide, diphenylsulphoxide.

* * * * *